Jan. 5, 1954  C. T. McCREADY  2,664,806
VINE TURNER ATTACHMENT FOR CULTIVATORS
Filed Jan. 10, 1951
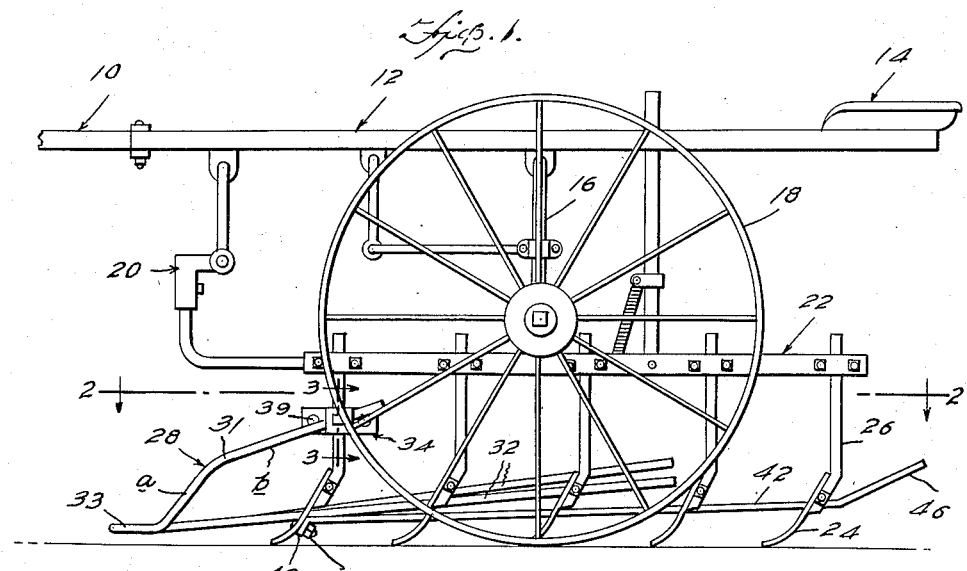
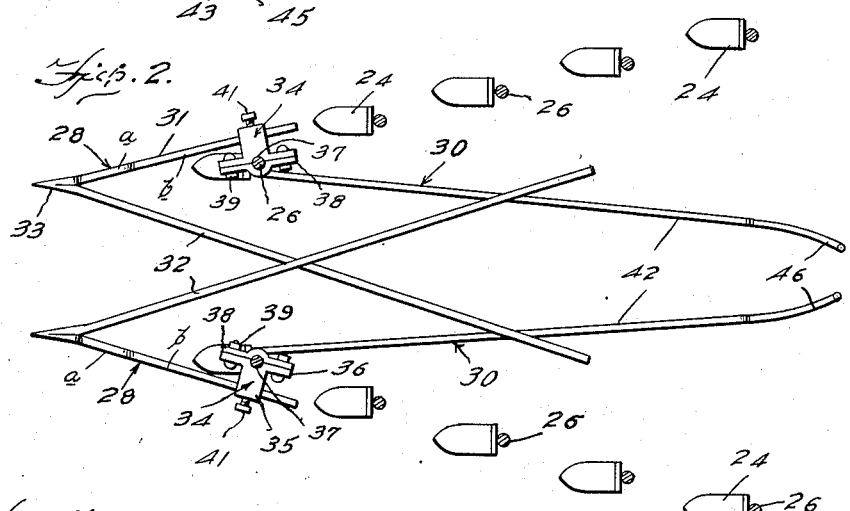
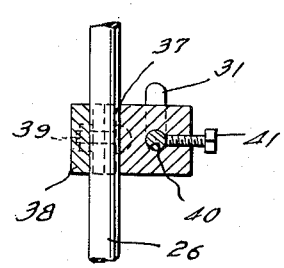
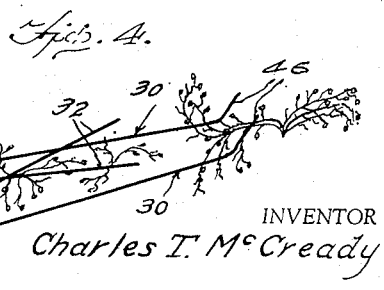
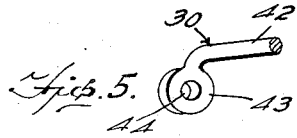
INVENTOR
Charles T. McCready
BY Wilfred E. Lawson
ATTORNEY Patented Jan. 5, 1954

2,664,806

UNITED STATES PATENT OFFICE 2,664,806

VINE TURNER ATTACHMENT FOR CULTIVATORS

Charles T. McCready, Onley, Va.

Application January 10, 1951, Serial No. 205,265

3 Claims. (Cl. 97—192)

This invention relates to vine turner attachment for cultivators.

A principal object of the present invention is to provide a vine turner for attachment to a cultivator, which not only functions to remove the vines from the paths of the cultivator shovels but also turns the vines over onto the top of the plant row.

Another object of the invention is to provide a vine turner of novel construction by means of which the vines will be turned first one way and then the other so as to effectively remove dirt and earth which may be adhering to the vines.

Still another object of the invention is to provide a vine turner which may be easily and quickly applied to any cultivator structure of the gang shovel type, without the necessity of making alterations in the construction of the cultivator itself.

Still another object of the invention is to provide a vine turner which is constructed in a novel manner whereby it may be applied to or mounted upon the cultivator shovel supporting shanks in any one of several different positions so that the point of the turner can penetrate the ground deeply or lightly.

The invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view in side elevation of a shovel cultivator applied thereto a vine turner apparatus constructed in accordance with the present invention.

Figure 2 is a horizontal section taken substantially on the line 2—2 of Figure 1.

Figure 3 is a detailed section taken substantially on line 3—3 of Figure 1.

Figure 4 is a diagrammatic view illustrating the manner in which the device turns the vines.

Figure 5 is a detail perspective view of the front or attached end of a rear unit rod.

Referring now more particularly to the drawing the numeral 10 generally designates the cultivator draft pole which is connected with the frame generally designated 12. Upon the rear of the frame is supported in the usual manner the operator's seat which is designated 14.

Connected with the frame 12 is the customary U-shaped axle 16 carrying at the two sides of the cultivator structure the wheels 18, one only of which is shown.

In accordance with the standard practice or conventional construction for cultivators of this type there are connected to the front part of the frame 12 by means of hanger mechanism which is generally designated 20, two substantially horizontally disposed shovel beams, one only of which is illustrated and generally designated 22. Each of the beams 22 carries a gang of shovels, each of which is here designated 24 and each of which shovels is suspended from the beam 22 by a suspension shank 26.

Figure 2 illustrates the forwardly converging arrangement of the shovel gangs. The convergent ends of the rows of shovels or of the gangs point in the direction in which the cultivator moves and as is, of course, understood by those versed in the art the row of plants lies between the shovel gangs so that the earth upon the two sides of the row is worked up by the shovels.

In the cultivation of vine plants such as peanut plants or the like it is important that the plants which normally spread out to some extent on both sides of the row, be turned back out of the path of the shovels and it is also desirable that adhering earth be shaken loose from the plants so that they may grow and develop to the best advantage. The vine turner apparatus comprising the present invention includes a pair of forward, substantially V-shaped units, each of which is generally designated 28, and a pair of rearward members each of which is designated 30.

Each V-shaped unit 28 comprises an arm 31 and a rod 32 which is of materially greater length than the arm and the rod and arm are joined together at one end to form the point or apex 33.

Just rearwardly of the point 33 of the unit, the arm 31 is bent to provide the upwardly projecting portion $a$ which merges with the reversely bent terminal portion $b$ which continues rearwardly at an upward inclination but at a flatter angle with respect to the horizontal, than the portion $a$. Thus the major part of the arm 31 is at a substantial elevation above the rod 32 with which it is connected.

The arm 31 of each unit is secured by a suitable means to the shank 26 of the forward plow of the group at one side of the machine so that the point or apex of the unit is directed forwardly in advance of the adjacent foremost plow 24 as shown in Figure 2. Thus the two units 28 are positioned in spaced relation at opposite sides of the plant row, each arm 31 being upon the outer side of the unit so that the rod 32 is nearest to the row and extends rearwardly obliquely across the row or, in other words, across the center of the path of travel of the machine.

While any suitable type of clamping means may be employed, there is here shown a clamp, generally designated 34 and comprising a block 35 having extending from two opposite sides the ears 36 and provided between the ears with a recess 37 in which the plow shank 26 positions. Overlying the shank 26, the adjacent end of the block and the ears 36, is a cap plate 38, the ends of which are secured to the ears 36 by a nut and bolt fastening means which is generally designated 39.

The clamp block 35 is provided with a transverse bore 40 through which the arm 31 of a unit 28 is extended and a set or binding screw 41 threaded into the block and entering the bore 40 serves to bind the arm in the desired set position.

As previously stated the rods 32 extend obliquely rearwardly across the plant row and across one another approximately midway between their ends. In addition the rods are vertically spaced so that the plant vines will not become jammed between them.

The rear members 30 cooperate with the rods 32 of the forward units in reversing the position of the vines. Each of these rear members comprises a single straight rod 42 which has a forward end which is flattened to form a head 43. This head 43 is turned at an angle to extend downwardly when the rod is in working position and is provided with an aperture 44 to receive a securing or mounting bolt 45.

Each of the members 30 is attached at its head end to the rear side of a front shovel 24, the shovel being provided with a suitable aperture for the passage of the mounting bolt 45 therethrough. The head 43 is angularly positioned with respect to the body of the rod 42 so that when so mounted the rod will extend rearwardly obliquely with respect to the plant row in slightly divergent relation with the rod 32 which is coupled with the same shovel.

At its rear end each of the rearward rods 42 is turned up slightly and inclined inwardly toward the center of the plant row as indicated at 46. In other words the upwardly turned rear ends 46 of the two rods 42 are inclined toward one another so that they will tend to turn inward toward the center of the row any of the ends of the vines sliding thereover.

As is clearly shown in Figure 4 the vine turner of the present invention functions to raise the vines on the upwardly inclined forward portions $a$ of the arms 31 of the front units so as to remove the vines from the path of the first plows. As the machine continues to advance the vines will be engaged by the inner sides of the rods 32 and be turned inwardly toward the center of the row until they arrive at the cross-over points of the rods 32 whereupon the vines which have been turned inwardly by the forward end portions of the rods 32 will be turned outwardly again by the rear end portions of the other rods.

The outwardly turned vines will then be contacted by the rear rod members or turning members 30 and will again be turned in by the rods 42. Finally the upturned inwardly inclined terminals 46 of the rods 42 will put the vines back in the center of the row where they will be left by the machine.

In addition to moving the vines away from the shovels, the vine turner apparatus functions to swing the vines back and forth in the manner described thereby freeing them of any dirt which may be clinging thereto and finally leaving the vines in the center of the row as described.

By vertically spacing the cross rods 32 from one another from the rear rods 42, the back and forth turning of the vines can be accomplished to effect the cleaning of the vines without injuring them.

I claim:

1. In a vine turned attachment for a cultivator of the type having two spaced gangs of shovels and suspending shanks therefor; a pair of units each having an arm and a rod joined at one end to form a V, the rods being of greater length than the arms, means securing each arm to and in crossed relation with a shovel shank of one gang to position the units at opposite sides of the longitudinal center of the cultivator, the apex of the V of each unit being pointed in the direction of travel of the cultivator, said rods of the units extending obliquely rearwardly one over the other in vertically spaced cross relation intermediate their ends, said vertical spacing of the rods permitting the free passage of vines therebetween, a pair of second rods, means securing each of the second rods to a shovel of one gang located rearwardly of the apex of the adjacent unit, each of said second rods extending obliquely rearwardly in crossed relation with and spaced below the rod of the remote unit.

2. The invention as set forth in claim 1, wherein the crossover point for the rods of the units lies in a vertical plane passing centrally between the shovel gangs, the said second rods each being secured to a shovel carried by a shank to which one unit arm is attached, said second rods extending rearwardly in convergent relation and each thereof being in crossed spaced relation with and below the rod of the remote unit.

3. The invention as set forth in claim 2, wherein said second rods have their rear ends curved upwardly and inclined toward one another.

CHARLES T. McCREADY.

References Cited in the file of this patent

UNITED STATES PATENTS

| Number | Name | Date |
| --- | --- | --- |
| 1,414,191 | Kosmalski | Apr. 25, 1922 |
| 1,563,765 | McCready | Dec. 1, 1925 |
| 1,622,497 | Dibble | Mar. 29, 1927 |
| 1,747,291 | Edwards | Feb. 18, 1930 |
| 1,878,443 | Hudec et al. | Sept. 20, 1932 |